United States Patent [19]

Kabay et al.

[11] 4,243,341
[45] Jan. 6, 1981

[54] PIVOT CONSTRUCTION

[75] Inventors: Steve Kabay, Novelty; Ralph E. Nemecek, Lyndhurst, both of Ohio

[73] Assignee: General Motors Corporation, Detroit, Mich.

[21] Appl. No.: 82,612

[22] Filed: Oct. 9, 1979

[51] Int. Cl.³ ............................................. F16C 11/00
[52] U.S. Cl. ..................................... 403/16; 403/158; 414/723
[58] Field of Search ................ 403/158, 157, 154, 16, 403/161, 163; 414/723; 37/118 R, 118 A; 172/273, 762

[56] References Cited
U.S. PATENT DOCUMENTS

| 1,243,820 | 10/1917 | Day | 403/157 |
| 2,967,726 | 1/1961 | Weston | 403/157 |
| 3,778,174 | 12/1973 | Molby et al. | 403/143 |
| 4,004,855 | 1/1977 | Stecklein | 403/158 |
| 4,096,957 | 6/1978 | Iverson et al. | 403/157 X R |

OTHER PUBLICATIONS

Timken Tapered Roller Bearings for Articulated Hitches, Copyright 1974 by the Timken Company.

Primary Examiner—Andrew V. Kundrat
Attorney, Agent, or Firm—Edward J. Biskup

[57] ABSTRACT

A pivot construction for connecting a pair of relatively movable members that include a stepped diameter pin one end of which is fastened to one of the members and the other end of which is received in an end cap member that serves to preload a tapered roller bearing assembly mounted on the other of the members.

2 Claims, 4 Drawing Figures

PIVOT CONSTRUCTION

The invention relates to hinge connections and more particularly concerns an improved pivot construction that is adapted for use with earth moving equipment which operate in an environment where grit, dirt and grime are common.

In the preferred form, the present invention contemplates a pivot construction for connecting a pair of relatively movable members, one of which includes a pair of laterally spaced plates and the other of which is located between the spaced plates. Each of the plates and the member in between are formed with a circular opening with the centers of the openings aligned along an axis extending transversely to the longitudinal axis of the plates. A cylindrical pin is located within the aligned circular openings and includes an enlarged head and a shank portion, the latter of which has a stepped diameter with the enlarged head being fixed at its outer end with a bar member. The enlarged head is located within the circular opening in one of the plates and the bar member is fastened thereto. In addition, an end cap member is located in the circular opening formed in the other of the plates and has a bore formed therein defined by a cylindrical wall and end wall. The end cap member serves to support the end portion of the shank, the intermediate portion of which supports a bearing assembly including inner race members and outer race members with tapered roller bearings interposed therebetween. The outer race members of the bearing assembly are fixedly mounted in the circular opening in the other relatively movable member while the inner race members are fixedly supported on the shank between the enlarged head and the cylindrical wall of the end cap member. The end cap member is connected to the shank of the pin in a manner so as to preload the roller bearing assembly between the enlarged head and the cylindrical wall.

The objects of the present invention are to provide a new and improved pivot construction for two relatively movable members that requires a minimum of service and has increased life; to provide a new and improved pivot construction that is simple and compact in design and is relatively inexpensive to manufacture; to provide a new and improved pivot construction in which the pin has a stepped diameter which accommodates an axially fixed bearing assembly for improved sealing; and to provide a new and improved pivot construction that utilizes a sealed tapered roller bearing assembly combined with a cylindrical pin one end of which is received within an end cap member that preloads the bearing assembly for maximum rigidity and shock resistance.

Other objects and advantages of the present invention will be more apparent from the following detailed description when taken with the drawing in which.

Figure 1:
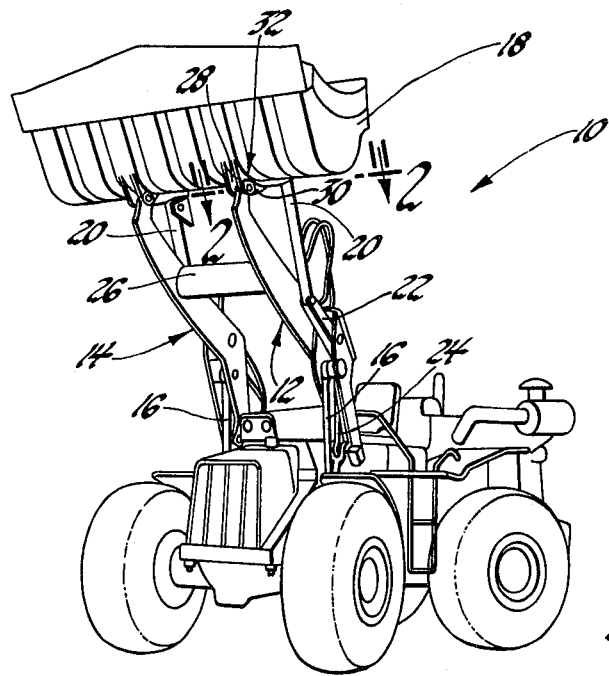
FIG. 1 is a view showing a front end loader employing a pivot construction made in accordance with the present invention.

Referring to the drawing and more particularly FIG. 1 thereof, an earth moving vehicle 10 of the front end loader type is shown having a pair of lift arms 12 and 14 pivotally connected at one end to the front end of the vehicle for movement about a horizontal axis from a lowered position to the raised position shown through the action of a pair of double-acting hydraulic cylinders, the rod portions 16 of which are shown only. The other end of the lift arms 12 and 14 pivotally supports a bucket 18 for movement about a transverse horizontal axis under the control of a tilt linkage mounted on each arm and including a double-acting hydraulic tilt cylinder 20, a bell crank 22 and a link 24. At the bucket end of the lift arms 12 and 14, a transversely extending torque tube 26 interconnects the lift arms 12 and 14 so as to make the latter rigid against twisting or bending loads.

Figure 2:
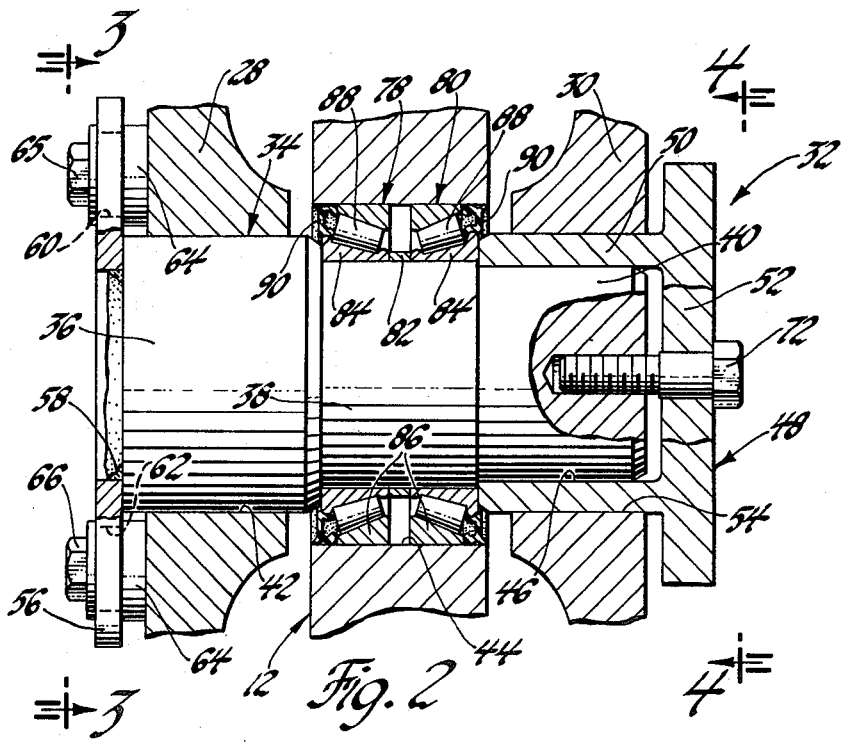
FIG. 2 is an enlarged view taken on line 2—2 of FIG. 1 and shows in detail the pivot construction made according to the present invention.
Figure 4:
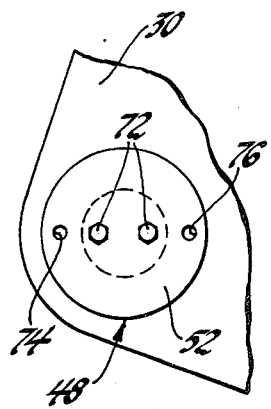
FIG. 4 is an end view taken on line 4—4 of FIG. 2.
Figure 3:
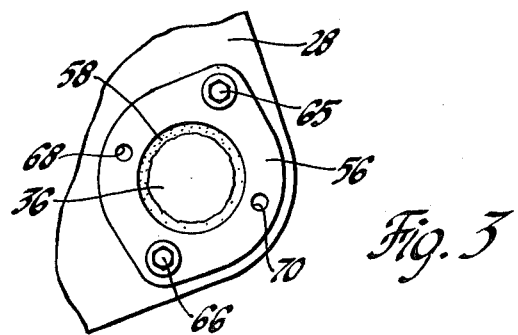
FIG. 3 is an end view taken on line 3—3 of FIG. 2.

As aforementioned, the forward end of the lift arms 12 and 14 support the bucket 18 for movement about a transversely extending horizontal axis. In this regard, it will be noted that the forward end of each lift arm 12 and 14 is pivotally connected to a pair of laterally spaced and parallel plate members 28 and 30 fixed with the back wall of the bucket by a pivot construction 32 made in accordance with the invention. As seen in FIG. 2, each pivot construction 32 comprises a cylindrical pin 34 formed at one end with an enlarged head 36 that is integral with a stepped diameter shank which consists of an intermediate portion 38 and an end portion 40. The enlarged head is located within a cylindrical opening 42 formed in the plate member 28 while the intermediate portion 38 of the shank is located within a cylindrical opening 44 formed in the lift arm 12.

The end portion 40 of the shank is received within a bore 46 formed in an end cap member 48 that is defined by a cylindrical wall 50 and an end wall 52. The cylindrical wall 50 of the end cap member 48 is located within a cylindrical opening 54 formed in the plate member 30 and, it will be noted, that all three of the openings 42, 44 and 54 are axially aligned along a transverse horizontal axis. In addition, it will be noted that the enlarged head 36 has a bar member 56 rigidly secured thereto by a circular weld 58. The bar member 56 is formed with a pair of opposed enlarged circular apertures 60 and 62 each of which is adapted to receive the outer end of a tapped boss 64 fixed with the side surface of the associated plate member 28 to thereby fix the head 36 of the pin 34 to the latter mentioned plate member through the cap screws 65 and 66. The bar member 56 is also formed with a pair of opposed circular apertures 68 and 70 which are tapped and adapted to receive long screws which will contact the aforesaid side surface and upon rotation cause the pin 34 to be eased out of the opening 42 during disassembly of the pivot construction.

The end cap member 48 is formed with four aligned apertures the inner two of which each receives a cap screw 72. The cap screws 72 fasten the end cap member 48 to the end portion 40 of the shank while the outer apertures 74 and 76 are tapped and serve the same function as the apertures 68 and 70 except, in this case, they help remove the end cap member from the opening 54.

A pair of bearing assemblies 78 and 80 are mounted on the intermediate portion 38 of the shank and are separated from each other by a spacer ring 82. Each of the bearing assemblies 78 and 80 comprises an inner race 84 press fitted onto the intermediate portion 38 and an outer race 86 press fitted within the circular opening 44 formed in the lift arm 12. Interposed between the inner and outer races 84 and 86 are a plurality of tapered rollers 88 which are permanently lubricated and sealed from dirt and other foreign material through an annular seal member 90 as shown.

The inner race 84 of bearing assembly 78 engages the shoulder formed with the enlarged head 36 while the inner race 84 of the bearing assembly 80 is engaged by the end of the cylindrical wall 50 which forms a part of the end cap member 48. Thus, by tightening the cap screws 72 in the end wall 52 of the end cap member 48, the bearing assemblies 78 and 80 are preloaded and axially fixed in position with the tapered roller bearings taking radial and thrust loads in any combination. As should be apparent from the above description, the pivot construction 32 is designed so as to provide maximum rigidity and shock resistance to resist side impact of the bucket 18 while at the same time providing free rotatable movement thereof about the pin 34.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A pivot construction for connecting a pair of relatively movable members, one of said members including a pair of laterally spaced plates and the other of said members being located between said spaced plates, each of said pair of spaced plates and said other member having a circular opening formed therein with the centers thereof aligned along an axis extending transversely to the longitudinal axis of each of said pair of members, a cylindrical pin formed with an enlarged head and a shank portion, said shank portion having a stepped diameter consisting of an intermediate portion and an end portion, a bar member fixed to the outer end of the enlarged head, the enlarged head being located in the circular opening in one of the plates, means fastening said bar member to said one of the plates, an end cap member having a bore formed therein defined by a cylindrical wall and an end wall, said end cap member being located in the circular opening in the other of said plates and supporting the end portion of said shank, a bearing assembly including a pair of inner race members and a pair of outer race members and tapered roller bearings interposed there-between, said outer race members being fixedly mounted in said circular opening in said other member and said inner race members being supported on said intermediate portion of the shank between said enlarged head and the cylindrical wall of said end cap member, and fastener means connecting said end cap member to said end portion of the shank for preloading said bearing assembly between said enlarged head and said cylindrical wall.

2. A pivot construction for connecting a pair of relatively movable members, one of said members including a pair of laterally spaced plates and the other of said members being located between said spaced plates, each of said pair of spaced plates and said other member having a circular opening formed therein with the centers thereof aligned along an axis extending transversely to the longitudinal axis of each of said pair of members, a cylindrical pin formed with an enlarged head and a shank portion, said shank portion having a stepped diameter consisting of an intermediate portion and an end portion, a bar member centrally fixed to the outer end of the enlarged head, the enlarged head being located in the circular opening in one of the plates, means fastening said bar member to said one of the plates, an end cap member having a bore formed therein defined by a cylindrical wall and an end wall, said end cap member being located in the circular opening in the other of said plates and supporting the end portion of said shank, a bearing assembly including a pair of inner race members and a pair of outer race members and tapered roller bearings interposed there-between, said outer race members being fixedly mounted in said circular opening in said other member and said inner race members being supported on said intermediate portion of the shank between said enlarged head and the cylindrical wall of said end cap member, said bar member and the end wall of the end cap member each being formed with a pair of diametrically opposed tapped apertures adapted to receive screw members for facilitating removal of the cylindrical pin and the end cap member from the associated circular openings, and fastener means connecting said end cap member to said end portion of the shank for preloading said bearing assembly between said enlarged head and said cylindrical wall.

* * * * *